US012574348B2

(12) United States Patent
Kong et al.

(10) Patent No.: US 12,574,348 B2
(45) Date of Patent: Mar. 10, 2026

(54) WIRED COMMUNICATION SYSTEM AND CONFIGURATION METHOD OF DEVICE ID IN WIRED COMMUNICATION SYSTEM

(71) Applicant: Hangzhou Shixin Technology Co., Ltd., Hangzhou (CN)

(72) Inventors: Lingjun Kong, Hangzhou (CN); Mingxue Xu, Hangzhou (CN); Yinhua Liu, Hangzhou (CN)

(73) Assignee: Hangzhou Shixin Technology Co., Ltd., Hangzhou (CN)

( * ) Notice: Subject to any disclaimer, the term of this patent is extended or adjusted under 35 U.S.C. 154(b) by 135 days.

(21) Appl. No.: 18/497,455

(22) Filed: Oct. 30, 2023

(65) Prior Publication Data

US 2024/0356892 A1 Oct. 24, 2024

(30) Foreign Application Priority Data

Apr. 20, 2023 (CN) .......................... 202310424368.X

(51) Int. Cl.
*H04L 61/50* (2022.01)
(52) U.S. Cl.
CPC .................................... *H04L 61/50* (2022.05)
(58) Field of Classification Search
CPC .............................. G06F 13/4291; H04L 12/40
See application file for complete search history.

(56) References Cited

U.S. PATENT DOCUMENTS

| | | | |
|---|---|---|---|
| 5,202,822 A | 4/1993 | McLaughlin et al. | |
| 2007/0171837 A1* | 7/2007 | Chen ...................... | G08B 25/04 370/452 |
| 2007/0204082 A1* | 8/2007 | Shimizu ................ | H04L 12/403 710/110 |

(Continued)

FOREIGN PATENT DOCUMENTS

| | | |
|---|---|---|
| CN | 101426013 A | 5/2009 |
| CN | 103401086 A | 11/2013 |

(Continued)

OTHER PUBLICATIONS

First office action of corresponding CN patent application No. 202310424368.X, English translation with original, 10 pages.

*Primary Examiner* — Getente A Yimer
(74) *Attorney, Agent, or Firm* — Chambliss, Bahner & Stophel, P.C.; Stephen D. Adams

(57) ABSTRACT

The present disclosure discloses a wired communication system, and a configuration method of a device ID in the wired communication system. The wired communication system includes: one master device, a plurality of slave devices and a plurality of communication lines, wherein, the plurality of communication lines and the plurality of slave devices are connected in parallel through each communication port of each slave device, and the connection mode of each communication port of each slave device is different. The configuration method of a device ID includes: configuring the number of communication lines to be equal to the number of communication ports of each slave device; mak- (Continued)

ing each communication port of each slave device and each communication line arranged in different connection mode; and determining an ID of each slave device according to the connection mode between each slave device and each communication line.

12 Claims, 5 Drawing Sheets

(56)  References Cited

U.S. PATENT DOCUMENTS

| | | | | |
|---|---|---|---|---|
| 2014/0052881 A1* | 2/2014 | Alley | ................. | G06F 13/4247 |
| | | | | 710/110 |
| 2020/0042487 A1* | 2/2020 | Wang | ................. | G06F 13/4291 |
| 2023/0065241 A1* | 3/2023 | Suzuki | ................... | H04L 12/40 |

FOREIGN PATENT DOCUMENTS

| | | | |
|---|---|---|---|
| CN | 106375569 | A | 2/2017 |
| CN | 110990325 | A | 4/2020 |
| CN | 211629246 | U | 10/2020 |
| JP | H01318195 | A | 12/1989 |

* cited by examiner

WIRED COMMUNICATION SYSTEM AND CONFIGURATION METHOD OF DEVICE ID IN WIRED COMMUNICATION SYSTEM

CROSS-REFERENCE OF RELATED APPLICATIONS

This application claims priority to Chinese patent application No. 202310424368.X, filed with the China National Intellectual Property Administration on Apr. 20, 2023 and entitled "WIRED COMMUNICATION SYSTEM AND CONFIGURATION METHOD OF DEVICE ID IN WIRED COMMUNICATION SYSTEM", the disclosure of which is hereby incorporated by reference in its entirety.

TECHNICAL FIELD

The disclosure relates to the technical field of wired communication, in particular to a wired communication system and a configuration method of device ID in a wired communication system.

BACKGROUND

Wired communication usually uses tangible media such as metal wires and optical fibers to transmit information, and uses optical or electrical signals to represent information such as sound, words and images. According to the peer-to-peer relationship between the two sides of wired communication, wired communication can be divided into three modes: no master-slave communication, single master-slave communication and multi-master-slave communication.

In a communication network, each node of no master-slave communication has no master device or slave device, and each node can choose whether to send data according to needs, so as to improve the communication efficiency of the bus. When a certain node fails, it will not affect the work of other nodes. Single master-slave communication means that in a communication network, one master device corresponds to only one slave device, and the master device directly transmits data to the slave device. Multi-master-slave communication means that one master device corresponds to multiple slave devices, and the information sent by the master device can be transmitted to multiple slave devices or designated slave devices, while the information sent by the slave devices can only be transmitted to the master device, and the slave devices cannot communicate directly with each other.

In the master-slave wired communication system, the transmission authority of communication data of the whole communication network is controlled by the master device, and the slave device can only passively receive and execute the commands sent by the master device and return data according to the requirements of the master device. The master device can send data to all slave devices at the same time, and can also communicate with one or more designated slave devices.

In the prior art, when the master device needs to communicate with the designated slave device, the master device usually needs to know the ID of the slave device in advance, and realizes the function of sending data or commands to the designated slave device by matching the communication addresses. Therefore, it is necessary to assign a unique ID to each slave device in advance as the unique identification of each slave device. As in the master-slave wired communication system shown in FIG. 1, the master device is connected with N slave devices through a bus, and each slave device has an independent and unique ID address. During communication, the master device initiates communication, and the slave device compares the address field in the received data with the device ID address of the local device according to the communication protocol: if the addresses match, the slave device receives the communication data, analyzes it, and execute corresponding functions; if the addresses do not match, the slave device does not receive data. This method requires an address field in communication each time, which limits the communication efficiency of the system to a certain extent. In this method, each slave device ID usually needs to be determined in advance, for example, it is solidified in the storage of the slave device by burning.

In addition to ID addressing, the master-slave wired communication system shown in FIG. 2 is an SPI protocol for addressing by hardware. SPI is a high-speed, full-duplex synchronous communication bus. SPI works in a master-slave mode, and usually needs 4 lines for communication, which are: MISO represents data input of master device and data output of slave device; MOSI represents data output of master device and data input of slave device; SCLK is a serial clock signal, which is generated by the master device and sent to the slave; CS is a chip select signal sent by the master device to control which slave device to communicate with. Only when the chip select signal CS is a predetermined enable signal, that is, high level or low level, can the master device effectively operate the slave device to realize the addressing of the slave device through the chip select signal CS. However, each slave device needs a CS signal line. When the number of slave devices is large, the ports of the master device will be occupied in large quantities, which increases the hardware port overhead and hardware cost of the master device. When a plurality of signal lines communicating, connection errors are easy to occur, and there is a risk of low communication efficiency.

SUMMARY

Therefore, the disclosure provides a wired communication system and a configuration method of a device ID in a wired communication system, which overcome the defects of high hardware cost and low communication efficiency of the master device in the prior art.

In order to achieve the above objective, the disclosure provides the following technical solution:

In a first aspect, an embodiment of the present disclosure provides a wired communication system, including one master device, a plurality of slave devices and a plurality of communication lines, wherein, the plurality of communication lines and the plurality of slave devices are connected in parallel through each communication port of each slave device, and the connection mode of each communication port of each slave device is different.

In an embodiment of the present disclosure, the ID of each slave device is determined according to different connection mode of the communication ports.

In an embodiment of the present disclosure, each communication port of each slave device and each communication line are connected and arranged into different connection mode in a manner of arrangement and combination, and the ID of each slave device is determined according to the connection mode.

In an embodiment of the present disclosure, the wired communication system further includes: one clock signal line, wherein the ports of each slave device are correspondingly added with one clock port, the master device is connected in parallel with each slave device through the clock signal line, and a clock signal is provided for each slave device through the clock signal line.

In an embodiment of the present disclosure, the slave device includes two slave devices: a first slave device and a second slave device; each of the first slave device and the second slave device includes an identification module, a first port and a second port, one of which is a communication port and the other is a clock port; a signal connection mode of each port of the two slave devices is different, and the IDs of the first slave device and the second slave device are determined through different connection mode.

In a second aspect, an embodiment of the disclosure provides a configuration method of a device ID in a wired communication system, based on the wired communication system according to the first aspect, the configuration method includes:

configuring the number of communication lines to be equal to the number of communication ports of each slave device;

making each communication port of each slave device and each communication line arranged in different connection mode; and determining an ID of each slave device according to the connection mode between each slave device and each communication line.

In an embodiment of the present disclosure, in the wired communication system, the number of slave devices and the number of communication lines satisfy the following mode:

the number of slave devices≤m!

wherein, m is the number of communication lines and m is a positive integer.

In an embodiment of the present disclosure, the number of communication lines is calculated by the following formula:

$$(m-1)! < \text{the number of slave devices} \le m!$$

by using the above formula, the number of communication lines is determined based on the number of slave devices.

In an embodiment of the present disclosure, in a connection relationship identification stage, each communication line of the master device sequentially emits a pulse signal in each clock cycle, and only one communication line emits the pulse signal in each pulse cycle, and each communication line only has one pulse signal.

In an embodiment of the present disclosure, the connection relationship is identified based on a sequence of the pulse signal received by each communication port through each communication line connected thereto, to determine the ID of each slave device.

In an embodiment of the present disclosure, the identification modules of the first and second slave devices determine signal connection mode of corresponding slave devices though the connection mode between the first and second ports and communication lines and clock signal lines. And the ID of each slave device is determined according to the signal connection mode of each slave device.

In an embodiment of the present disclosure, the identification modules of the first and second slave devices judge the signal connection mode of the first and second ports of corresponding slave devices according to whether a signal reversal is regular or not.

In an embodiment of the present disclosure, the port of the slave device is connected to a clock signal line when the signal reversal of the port is detected changing regularly; the port of the slave device is connected to the communication line when the signal reversal of the port is detected changing irregularly.

In an embodiment of the present disclosure, when the first port of the first slave device is connected to the clock signal line, and the second port of the first slave device is connected to the communication line, the first port of the second slave device is connected to the communication line and the second port of the second slave device is connected to the clock signal line.

In an embodiment of the present disclosure, after the step of determining the ID of each slave device, the configuration method further includes: sequentially sending data packets by the master device according to a predetermined ID sequence, and selecting a data packet at a corresponding position on the communication line by each slave device according to its own ID.

The technical solution of the disclosure has the following advantages:

1. The disclosure provides a wired communication system and a configuration method of a device ID in a wired communication system. The plurality of communication lines and the plurality of slave devices are connected in parallel through each communication port of each slave device, and the connection mode of each communication port of each slave device is different. The unique identification of the device ID is realized according to the different connection mode of each communication port, so as to reduce the hardware port overhead and improve the communication efficiency.

2. The disclosure provides a wired communication system and a configuration method of a device ID in a wired communication system. Each slave device ID does not need to be predetermined in advance, and the ID of each slave device is determined in real time according to the connection mode between the communication port of the slave device and the communication line. The master device sequentially sends data packets according to the predetermined ID sequence, and each slave device selects a data packet at a corresponding position on the communication line according to its own ID, so as to improve the communication efficiency.

BRIEF DESCRIPTION OF THE DRAWINGS

In order to explain more clearly the specific embodiments of the disclosure or the technical solutions in the prior art, a brief introduction will be given below of the drawings required for use in the description of the specific embodiments or the prior art. It will be apparent that the drawings in the following description are some embodiments of the disclosure, from which other drawings may be obtained without creative effort by those of ordinary skill in the art.

DETAILED DESCRIPTION

A clear and complete description of the technical solutions of the disclosure will be given below in conjunction with the accompanying drawings, and it will be apparent that the described embodiments are part of and not all of the embodiments of the disclosure. Based on the embodiments in the present disclosure, all other embodiments obtained by those of ordinary skill in the art without making creative efforts are within the scope of protection of the present disclosure.

In the description of the disclosure, it should be noted that the orientation or position relationships indicated by the terms "center", "up", "down", "left", "right", "vertical", "horizontal", "inside", "outside", etc. are based on the orientation or position relationships shown in the attached drawings only for the purpose of facilitating the description of the disclosure and simplifying the description, and are not intended to indicate or imply that the device or element referred to must have a particular orientation, be constructed and operate in a particular orientation and therefore cannot be construed as a limitation to the disclosure. Furthermore, the terms "first", "second" and "third" are used for descriptive purposes only and cannot be understood to indicate or imply relative importance.

In the description of the disclosure, it should be noted that the terms "mounted", "connected", "connection", and the like should be understood in a broad sense unless otherwise specified and defined, for example, "connection" may be fixed connection or detachable connection or integrated connection, may be mechanical connection or electrical connection, may be direct connection or indirect connection through an intermediate medium, and may be internal connection of two elements. For those of ordinary skilled in the art, the specific meanings of the above terms in the present application may be understood according to specific situations.

Further, the technical features involved in the different embodiments of the disclosure described below may be combined with each other as long as they do not conflict with each other.

Embodiment 1

Figure 1:
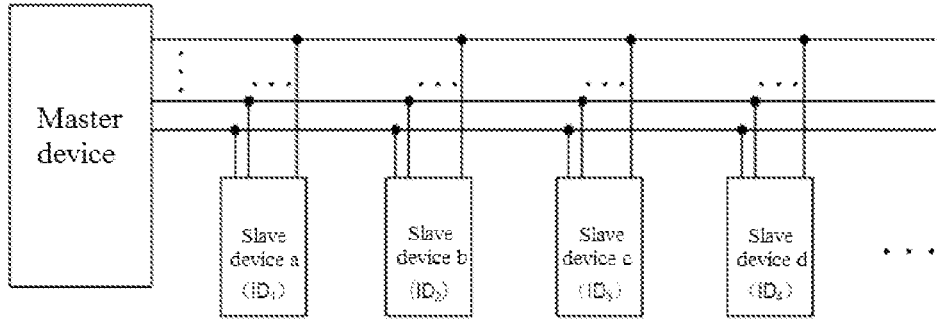
FIG. 1 is a system block diagram of a specific example of a master-slave wired communication system provided by the prior art.
Figure 2:
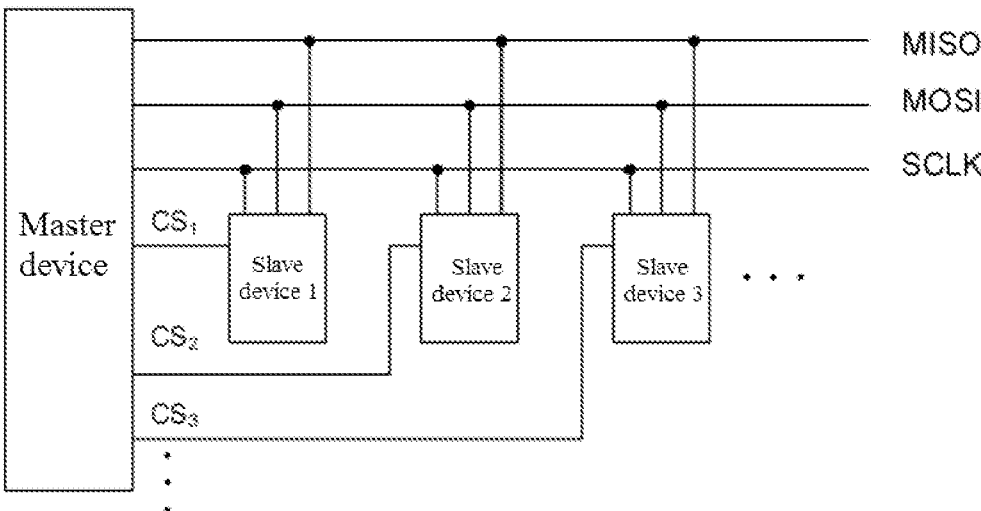
FIG. 2 is a system block diagram of another specific example of the master-slave wired communication system provided by the prior art.
Figure 3:
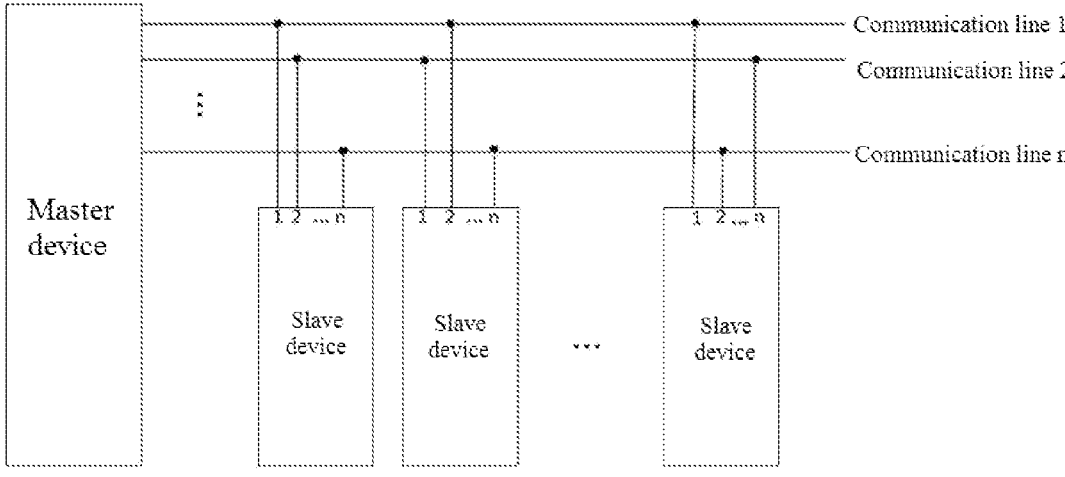
FIG. 3 is a system block diagram of a specific example of a wired communication system provided by an embodiment of the present disclosure.

An embodiment of the disclosure provides a wired communication system, as shown in FIG. 3. The system includes one master device, a plurality of slave devices and a plurality of communication lines. The plurality of communication lines and the plurality of slave devices are connected in parallel through each communication port of each slave device, and the connection mode of each communication port of each slave device is different. Different connection modes are arranged in a manner of Permutation and Combination. The ID of each slave device is determined according to the different connection mode of each communication port, so as to reduce the hardware port overhead and improve the communication efficiency.

Based on the configuration system of this embodiment, the configuration method includes: the number of communication lines is configured to be equal to the number of communication ports of each slave device; each communication port of each slave device and each communication line are arranged in different connection mode; and an ID of each slave device is determined according to the connection mode between each slave device and each communication line.

In the embodiment of the disclosure, the number of slave devices and the number of communication lines satisfy the following mode:

the number of slave devices$\leq$m!

wherein, m is the number of communication lines and m is a positive integer.

In the embodiment of the disclosure, the number of communication lines is calculated by the following formula:

$$(m-1)! < \text{the number of slave devices} \leq m!$$

by using the above formula, the number of communication lines is determined based on the number of slave devices. For example, when the number of slave devices is 5, the corresponding number of communication lines is 3; when the number of slave devices is 6, the corresponding number of communication lines is 3; when the number of slave devices is 23, the corresponding number of communication lines is 4. In practical application, the number of communication lines is determined according to the actual number of slave devices, thereby determining the number of ports of each slave device.

In a specific embodiment, as shown in FIG. 3, the master device has n ports which are connected to communication line 1, communication line 2, . . . , and communication line n, respectively. The number of communication ports provided for each slave device is the same, and the number of communication lines is equal to the number of communication ports of each slave device, so that the communication ports of the slave device are 1, 2, . . . , and n, respectively.

Figure 4:
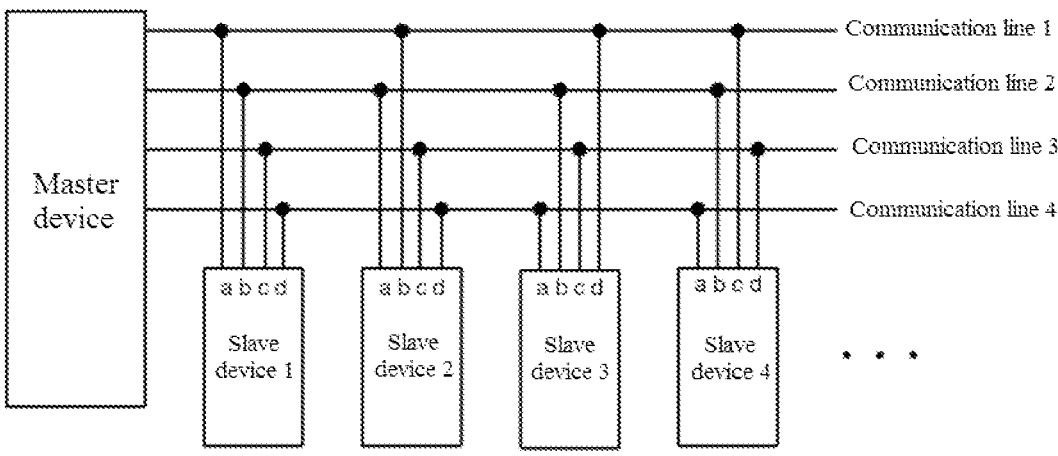
FIG. 4 is a system block diagram of another specific example of the wired communication system provided by an embodiment of the present disclosure.

In a specific embodiment, as shown in FIG. 4, the master device communicates with the slave device through four communication lines, namely, the communication line 1, the communication line 2, the communication line 3 and the communication line 4. Each slave device has four communication ports, which are denoted as a, b, c and d. At this time, up to 24 slave devices can be accommodated.

Each slave device is uniquely identified by different connection modes with four communication lines, thus realizing addressing. As shown in FIG. 4, the slave device 1 is marked by connecting four communication ports a, b, c and d of the slave device 1 to 4 communication lines in sequence, namely a-1, b-2, c-3 and d-4, and this connection mode serves as the ID of the slave device 1. The identification mode of the slave device 2 is a-2, b-1, c-3, and d-4, and the connection mode is used as the ID of the slave device 2.

Four communication lines are arranged, which can identify up to 24 slave devices according to different arrangements and combinations. As shown in the following table, there are 24 ways to identify the slave devices, in which 1, 2, 3 and 4 are used to represent four communication lines, and a, b, c and d are used to represent four communication ports of slave devices.

As can be seen from the following table, the IDs of a certain number of slave devices are identified by different connection modes between the communication lines and the communication ports of the slave devices.

8 the ID of each slave device. According to the ID of each slave device, the configuration of the ID of the wired communication device is completed.

In the embodiment of the disclosure, the ID of each slave device is determined according to the connection mode between the communication port of the slave device and the communication line. Since each communication line has only one pulse signal, the connection mode between each port of the slave device and the communication line is determined by using the sequence of the pulse signal generated by each communication line in the connection rela-

| Port | $ID_1$ | $ID_2$ | $ID_3$ | $ID_4$ | $ID_5$ | $ID_6$ | $ID_7$ | $ID_8$ | $ID_9$ | $ID_{10}$ | $ID_{11}$ | $ID_{12}$ |
|---|---|---|---|---|---|---|---|---|---|---|---|---|
| a | 1 | 1 | 1 | 1 | 1 | 1 | 2 | 2 | 2 | 2 | 2 | 2 |
| b | 2 | 2 | 3 | 3 | 4 | 4 | 1 | 1 | 3 | 3 | 4 | 4 |
| c | 3 | 4 | 2 | 4 | 2 | 3 | 3 | 4 | 1 | 4 | 1 | 3 |
| d | 4 | 3 | 4 | 2 | 3 | 2 | 4 | 3 | 4 | 1 | 3 | 1 |

| Port | $ID_{13}$ | $ID_{14}$ | $ID_{15}$ | $ID_{16}$ | $ID_{17}$ | $ID_{18}$ | $ID_{19}$ | $ID_{20}$ | $ID_{21}$ | $ID_{22}$ | $ID_{23}$ | $ID_{24}$ |
|---|---|---|---|---|---|---|---|---|---|---|---|---|
| a | 3 | 3 | 3 | 3 | 3 | 3 | 4 | 4 | 4 | 4 | 4 | 4 |
| b | 1 | 1 | 2 | 2 | 4 | 4 | 1 | 1 | 2 | 2 | 3 | 3 |
| c | 2 | 4 | 1 | 4 | 1 | 2 | 2 | 3 | 1 | 3 | 1 | 2 |
| d | 4 | 2 | 4 | 1 | 2 | 1 | 3 | 2 | 3 | 1 | 2 | 1 |

In the wired communication system and the configuration method of the device ID in the wired communication system provided by the embodiment of the disclosure, a plurality of communication lines and a plurality of slave devices are connected in parallel through each communication port of each slave device, and the connection mode of each communication port of each slave device is different. Different connection mode are arranged in a manner of arrangement and combination, and the ID of each slave device is determined according to the different connection mode of the communication ports. When the master device needs to send different data to all slave devices, the master device can send data packets in sequence according to the predetermined ID sequence, and each parallel slave device can take the data packet at the corresponding position on the communication line according to its own ID. Compared with the prior art, the communication efficiency is greatly improved.

Embodiment 2

Figure 5:
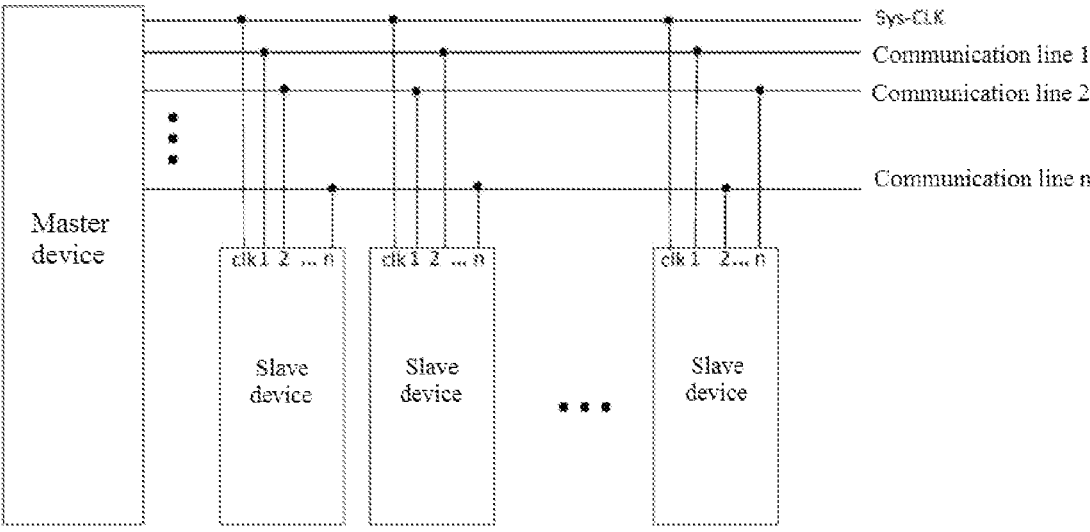
FIG. 5 is a system block diagram of yet another specific example of the wired communication system provided by an embodiment of the present disclosure.

An embodiment of the disclosure provides a wired communication system. As shown in FIG. 5, based on the wired communication system provided in embodiment 1, a wired communication device cluster provided in this embodiment further includes: one clock signal line Sys-CLK, wherein, one clock port clk is added to the port of each slave device, the master device is connected in parallel with each slave device through the clock signal line, and the clock signal clk is provided for each slave device through the clock signal line Sys-CLK. The clock signal is introduced to identify the connection relationship.

According to the wired communication system of the present embodiment, the configuration method includes: in the connection relationship identification stage, each communication line of the master device sequentially emits a pulse signal in each clock cycle, and only one communication line emits the pulse signal in each clock cycle, and each communication line only has one pulse signal. The connection relationship is identified based on a sequence of the pulse signal received by each communication port through each communication line connected thereto, to determine tionship identification stage, thereby identifying the ID of the slave device, and completing the configuration of the ID of the wired communication device through the ID of each slave device.

Figure 6:
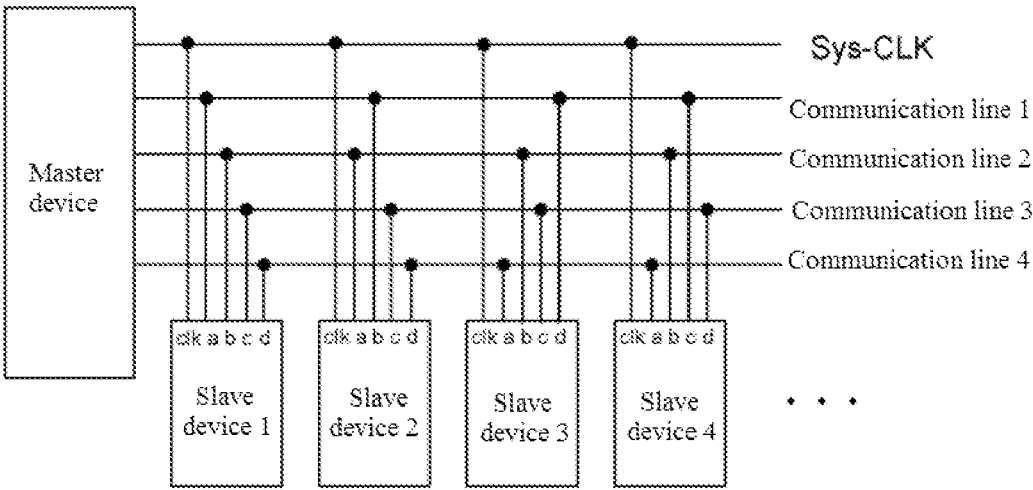
FIG. 6 is a system block diagram of yet another specific example of the wired communication system provided by an embodiment of the present disclosure.

In a specific embodiment, as shown in FIG. 6, the master device supplies a clock signal to the clock port clk of each slave device through a clock signal line Sys-CLK, and the communication ports a, b, c and d of the slave device are connected to the communication lines 1, 2, 3, and 4 in different ways by arrangement and combination, thereby identifying different device IDs.

Figure 7A:
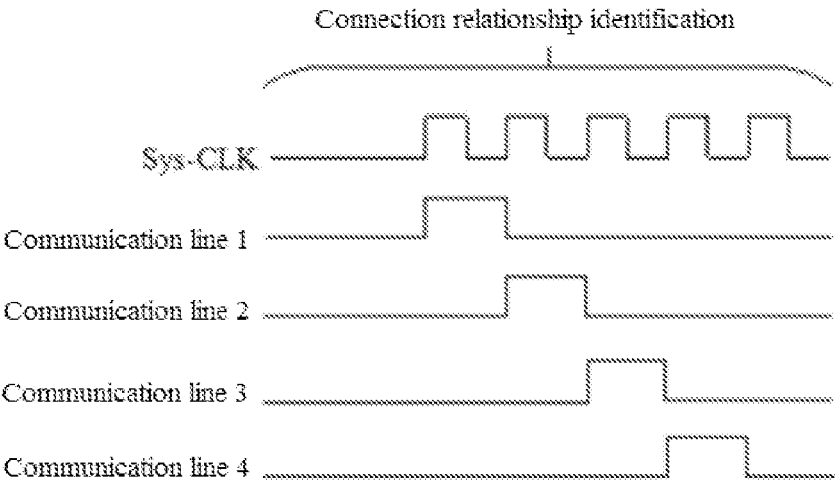
FIG. 7a is a timing diagram of a specific example of a communication system entering a connection relationship identification phase provided by an embodiment of the present disclosure.

When the communication system enters the connection relationship identification stage, each communication line connected with the master device will give pulse signals in turn at a given time. As shown in FIG. 7a, in the first clock cycle of the master device in the connection relationship identification stage, the communication line 1 is controlled to correspondingly give a pulse signal, which is illustrated as a high-level pulse; the communication line 2 correspondingly gives a pulse signal at the second clock cycle of the connection relationship identification stage, and so on.

Figure 7B:
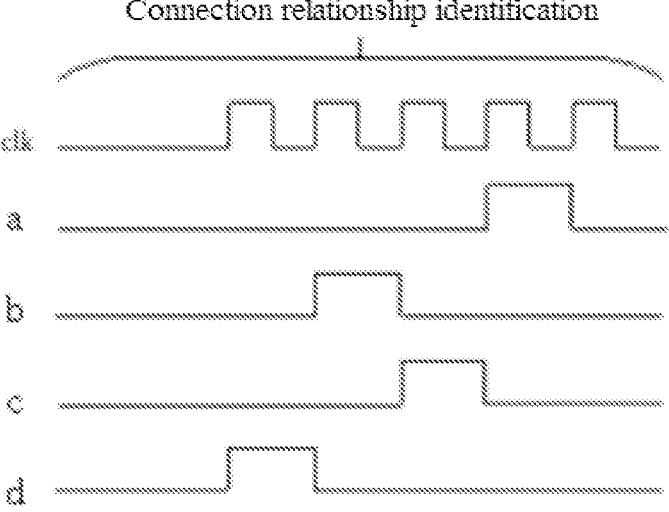
FIG. 7b is a timing diagram of a specific example of slave device detection entering a connection relationship identification phase provided by an embodiment of the present disclosure.

When the slave device detects that it has entered the connection relationship identification stage, the slave device can judge the connection relationship of its communication lines according to the sequence of pulses received by each port, and obtain the slave device ID according to the connection relationship, thus realizing addressing. As shown in FIG. 7b, the connection relationship identification process of the ports of the slave device 3 is as follows:

In the connection relationship identification stage, the slave device 3 detects that the port a receives a pulse signal in the fourth clock cycle, and judges that it is a-4; the slave device 3 detects that the port b receives the pulse signal in the second clock cycle, and judges that it is b-2; the slave device 3 detects that the port c receives the pulse signal in the third clock cycle, and judges that it is c-3; the slave device 3 detects that the port d receives a pulse signal in the first clock cycle, and judges that it is d-1. According to this, the ID of the slave device 3 shown in FIG. 6 is determined. For example, it can be known by looking up the table that the slave device 3 corresponds to $ID_{22}$. Looking up the table is only one of the determination methods, and there are many means to realize it in practice.

When each slave device identifies its own ID and the master device needs to send different data to all slave devices, the master device can send data packets in turn according to the established ID sequence, and each parallel slave device can take the data packet at the corresponding position on the communication line according to its own ID. Compared with the prior art, the communication efficiency is greatly improved.

For the wired communication system and the configuration method of the device ID in the wired communication system provided by the embodiment of the disclosure, according to the wired communication system and the configuration method of the device ID in the wired communication system of Embodiment 1, one clock port clk is correspondingly added to the port of each slave device, the master device is connected in parallel with each slave device through a clock signal line, and the clock signal clk is provided for each slave device through the clock signal line Sys-CLK to ensure that the slave devices can operate synchronously, so as to identify the pulse position of each communication line, so that each slave device can determine the communication line connected to each port through the sequence of the pulse signal received by each port, thereby obtaining the connection relationship between the port and the communication line and determining the respective IDs of the slave devices.

Embodiment 3

Figure 8:
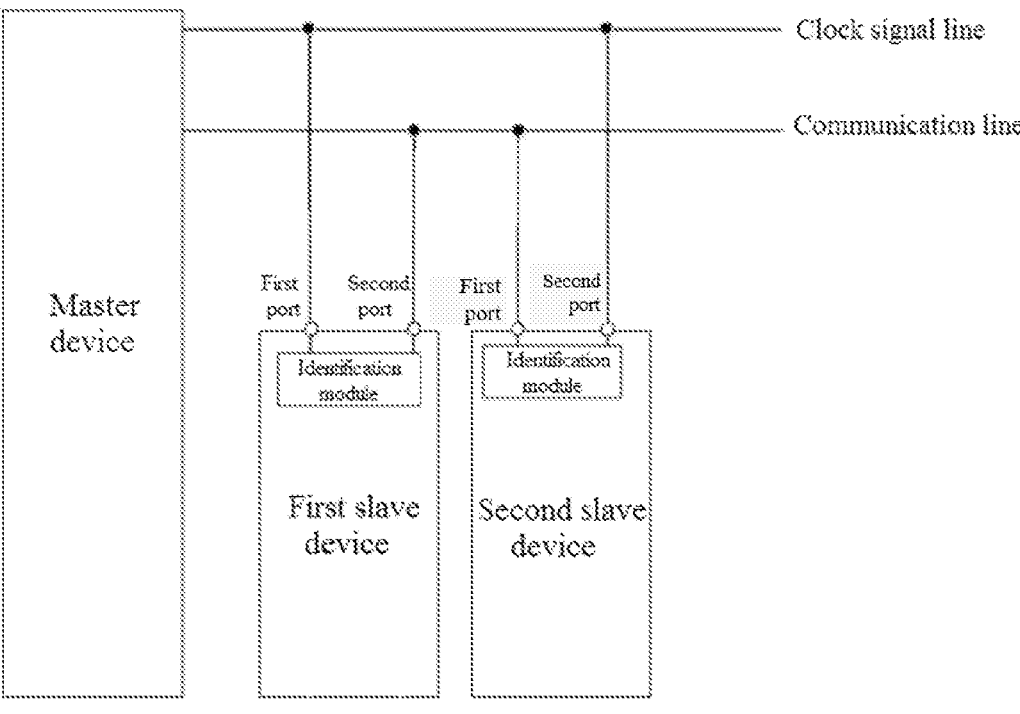
FIG. 8 is a system block diagram of yet another specific example of device ID configuration of the wired communication system provided by an embodiment of the present disclosure.

An embodiment of the present disclosure provides a wired communication system, as shown in FIG. 8, based on the wired communication system provided by Embodiment 2, the slave device includes two slave devices: a first slave device and a second slave device; each of the first slave device and the second slave device includes an identification module, a first port and a second port, one of which is a communication port and the other is a clock port; the signal connection mode of each port of the two slave devices is different, and the IDs of the first slave device and the second slave device are determined through different connection mode.

In the embodiment of the disclosure, the identification modules of the first and second slave devices determine signal connection mode of corresponding slave devices though the connection condition between the first and second ports and communication lines and clock signal lines. And the ID of each slave device is determined according to the signal connection mode of each slave device.

In the embodiment of the present disclosure, the identification modules of the first and second slave devices judge the signal connection mode of the first and second ports of corresponding slave devices according to whether a signal reversal is regular or not.

In the embodiment of the present disclosure, the port of the slave device is connected to a clock signal line when the signal reversal of the port is detected changing regularly; the port of the slave device is connected to the communication line when the signal reversal of the port is detected changing irregularly.

In the embodiment of the disclosure, when the first port of the first slave device is connected to the clock signal line, and the second port of the first slave device is connected to the communication line, the first port of the second slave device is connected to the communication line and the second port of the second slave device is connected to the clock signal line.

In the embodiment of the disclosure, after the step of determining the ID of each slave device, the method further includes: the master device sequentially sends data packets according to a predetermined ID sequence, and each slave device selects a data packet at a corresponding position on the communication line according to its own ID.

Figure 9:
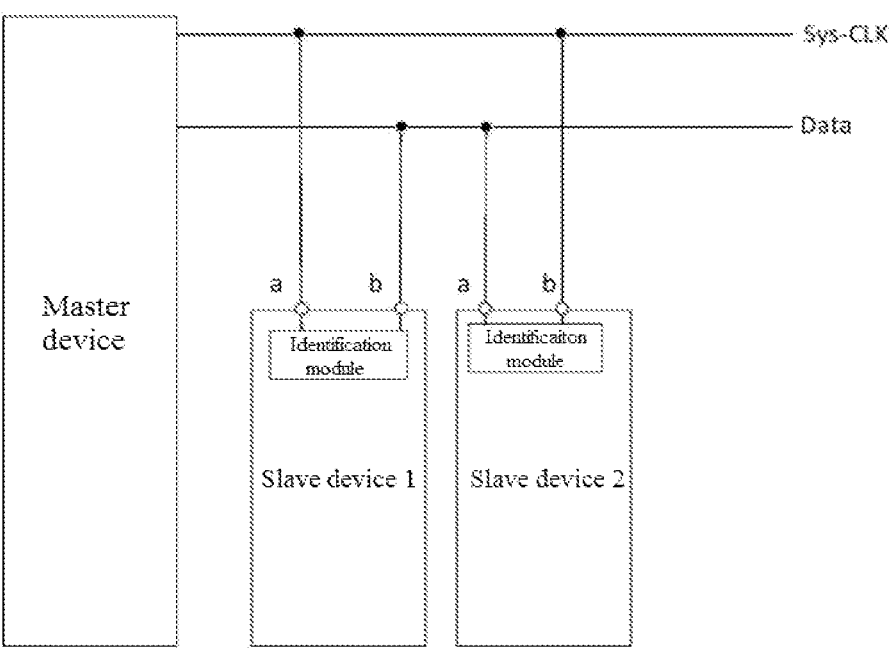
FIG. 9 is a system block diagram of yet another specific example of device ID configuration of the wired communication system provided by an embodiment of the present disclosure.

In a specific embodiment, as shown in FIG. 9, the slave device includes a slave device 1 and a slave device 2. The slave device 1 and the slave device 2 each include an identification module, port a and port b. One of ports a and b is a communication port, and the other is a clock port. The signal connection mode of each port of the two slave devices is different. For example, the clock signal line Sys-CLK is connected to the port a of the slave device 1, and the communication line Data is connected to the port b of the slave device 1; the communication line Data is connected to the port a of the slave device 2 and the clock signal line Sys-CLK is connected to the port b of the slave device 2.

When the slave device identifies its own ID and the master device needs to send different data to all slave devices, the master device can send data packets in turn according to the established ID sequence, and each parallel slave device can take a data packet at a corresponding position on the communication line according to its own ID. Compared with the prior art, the communication efficiency is greatly improved.

In a specific embodiment, as shown in FIG. 9, the slave device which port a is connected to the clock signal line Sys-CLK, and the port b is connected to the communication line Data is named as $ID_1$; which port a is connected to the communication line Data, and the port b is connected to the clock signal line Sys-CLK is named as $ID_2$. Each slave device contains an identification module for identifying the signal connection mode of the ports a and b, and confirms the device ID by identifying the different connection modes between each port and the clock signal line Sys-CLK and the communication line Data, so that the corresponding data content can be obtained according to the ID information when receiving data.

As shown in FIG. 9, in the two different connection modes of the slave device 1 and the slave device 2, when the slave device enters the connection relationship identification stage, the slave device can judge the connection relationship between the port and the communication line according to a reversal mode of the signal received by each port.

For example, the port a of the slave device 1 is connected with the clock signal line Sys-CLK, and the port b is connected with the communication line Data. In a long period of time, the identification module detects whether the signals of the two ports change regularly, that is, whether there is a high and low level reversal according to a fixed period. If the port signal changes regularly, it can be known that the port is connected with a clock signal line. If the port signal changes irregularly, it can be known that the port is connected with a communication line. In order to further improve the detection accuracy, the master device may also be required to send specific data, such as a number of successive "ones" or successive "zeros", through the communication line Data during the connection relationship identification stage.

In the wired communication system and the configuration method of the device ID in the wired communication system provided in the embodiment of the disclosure, when only the clock signal line Sys-CLK and the communication line Data are available, an identification module is added to the slave device. When the slave device enters the connection relationship identification stage, the slave device can judge the connection relationship between the port and the communication line and confirm the device ID according to the reversal mode of the signal received by each port without additional hardware overhead, thus improving the communication efficiency of the system to a certain extent and reducing the hardware cost.

Apparently, the above-described embodiments are merely examples for clarity of illustration and are not intended to be a limitation to the embodiments. Other variations or alterations in different forms may be made on the basis of the above description for those of ordinary skill in the art. There is no need and cannot be an exhaustive list of all embodiments here. The obvious variations or alterations resulting therefrom are still within the scope of the present disclosure.

What is claimed is:

1. A wired communication system, comprising one master device, a plurality of slave devices and a plurality of communication lines, the plurality of communication lines being communication lines participating in ID configuration of the slave devices, the plurality of slave devices being connected in parallel to the master device via the plurality of communication lines, each communication port of each slave device and each communication line being arranged into different connection mode in a manner of arrangement and combination, and the ID of each slave device being determined according to the connection mode, wherein the number of communication ports of each slave device is the same, and the number of communication lines is equal to the number of communication ports of a single slave device, in the wired communication system, the number of slave devices and the number of communication lines satisfy the following mode:

the number of slave devices≤m!

wherein, m is the number of communication lines and m is a positive integer.

2. The wired communication system according to claim 1, wherein the wired communication system further comprises: one clock signal line, wherein the ports of each slave device are correspondingly added with one clock port, the master device is connected in parallel with each slave device through the clock signal line, and a clock signal is provided for each slave device through the clock signal line.

3. The wired communication system according to claim 2, wherein the slave device comprises two slave devices: a first slave device and a second slave device; each of the first slave device and the second slave device comprises an identification module, a first port and a second port, one of which is a communication port and the other is a clock port; a signal connection mode of each port of the two slave devices is different, and the IDs of the first slave device and the second slave device are determined through different connection mode.

4. A configuration method of a device ID in a wired communication system, wherein, based on the wired communication system according to claim 1, the configuration method comprises:

configuring the number of communication lines to be equal to the number of communication ports of each slave device;

making each communication port of each slave device and each communication line arranged in different connection mode in a manner of arrangement and combination; and determining an ID of each slave device according to the connection mode between each slave device and each communication line, in the wired communication system, the number of slave devices and the number of communication lines satisfy the following mode:

the number of slave devices≤m!

wherein, m is the number of communication lines and m is a positive integer.

5. The configuration method of a device ID in a wired communication system according to claim 4, wherein, the number of communication lines is calculated by the following formula:

$$(m-1)! < \text{the number of slave devices} \leq m!$$

by using the above formula, the number of communication lines is determined based on the number of slave devices.

6. The configuration method of a device ID in a wired communication system according to claim 4, wherein, in a connection relationship identification stage, each communication line of the master device sequentially emits a pulse signal in each clock cycle, and only one communication line emits the pulse signal in each clock cycle, and each communication line only has one pulse signal.

7. The configuration method of a device ID in a wired communication system according to claim 6, wherein, the connection relationship is identified based on a sequence of the pulse signal received by each communication port through each communication line connected thereto, to determine the ID of each slave device.

8. The configuration method of a device ID in a wired communication system according to claim 4, wherein, the identification modules of the first and second slave devices determine signal connection mode of corresponding slave devices though the connection condition between the first and second ports and communication lines and clock signal lines; and the ID of each slave device is determined according to the signal connection mode of each slave device.

9. The configuration method of a device ID in a wired communication system according to claim 8, wherein, the identification modules of the first and second slave devices judge the signal connection mode of the first and second ports of corresponding slave devices according to whether a signal reversal is regular or not.

10. The configuration method of a device ID in a wired communication system according to claim 9, wherein, the port of the slave device is connected to a clock signal line when the signal reversal of the port is detected changing regularly; the port of the slave device is connected to the communication line when the signal reversal of the port is detected changing irregularly.

11. The configuration method of a device ID in a wired communication system according to claim 8, wherein, when the first port of the first slave device is connected to the clock signal line, and the second port of the first slave device is connected to the communication line, the first port of the second slave device is connected to the communication line and the second port of the second slave device is connected to the clock signal line.

12. The configuration method of a device ID in a wired communication system according to claim 4, after the step of determining the ID of each slave device, further comprising: sequentially sending data packets by the master device according to a predetermined ID sequence, and selecting a data packet at a corresponding position on the communication line by each slave device according to its own ID.

* * * * *